US007429336B2

(12) United States Patent
Keenan et al.

(10) Patent No.: US 7,429,336 B2

(45) Date of Patent: Sep. 30, 2008

(54) INKJET PRINTHEADS

(76) Inventors: Phil Keenan, Liffey Park Barnhall Road, Leixlip Co, Kildare (IE); Laura Annett, Liffey Park Barnhall Road, Leixlip Co., Kildare (IE); Declan John McCabe, Liffey Park Barnhall Road, Leixlip Co., Kildare (IE)

( * ) Notice: Subject to any disclaimer, the term of this patent is extended or adjusted under 35 U.S.C. 154(b) by 394 days.

(21) Appl. No.: 10/947,373

(22) Filed: Sep. 23, 2004

(65) Prior Publication Data

US 2005/0110829 A1 May 26, 2005

(30) Foreign Application Priority Data

Sep. 24, 2003 (EP) ................................ 03103539

(51) Int. Cl.
*G11B 5/127* (2006.01)

(52) U.S. Cl. ........................................................ 216/27

(58) Field of Classification Search .................. 347/12, 347/40, 43, 65; 216/27
See application file for complete search history.

(56) References Cited

U.S. PATENT DOCUMENTS 4,894,664 A 1/1990 Tsung Pan
5,818,516 A 10/1998 Rezanka
6,007,176 A 12/1999 Powers et al.
6,280,013 B1 8/2001 Courian et al.
6,766,817 B2 7/2004 Da Silva
6,902,867 B2 * 6/2005 Hall et al. .................. 430/311

FOREIGN PATENT DOCUMENTS

EP 0 352 726 1/1990

OTHER PUBLICATIONS

Kneezel, G.A. et al., "Corrosion-Resistant Heat Sinking Substrate For Thermal Ink Jet Printheads," Xerox Disclosure Journal, Xerox Corporation, US, vol. 22, No. 6, (Nov. 1, 1997).
EP 03 10 3539, "Search Report", Feb. 4, 2004.

* cited by examiner

*Primary Examiner*—Lamson D Nguyen

(57) ABSTRACT

A method of making an inkjet printhead comprising providing a substrate having first and second opposite surfaces, providing a support member, bonding the second surface of the substrate to the support member, and, after the substrate and support member are bonded together, forming a plurality of ink ejection elements on the first surface of the substrate, the method further including forming communicating ink supply slots passing respectively through the substrate and support member to provide fluid communication between an ink supply and the ink ejection elements.

10 Claims, 5 Drawing Sheets

INKJET PRINTHEADS

TECHNICAL FIELD

This invention relates to inkjet printheads and to a method of fabricating such printheads.

BACKGROUND ART

Inkjet printers operate by ejecting small droplets of ink from individual orifices in an array of such orifices provided on a nozzle plate of a printhead. The printhead forms part of a print cartridge which can be moved relative to a sheet of paper and the timed ejection of droplets from particular orifices as the printhead and paper are relatively moved enables characters, images and other graphical material to be printed on the paper.

A typical conventional printhead is fabricated from a silicon substrate having thin film resistors and associated circuitry deposited on a front surface of the substrate. The resistors are arranged in an array relative to one or more ink supply slots in the substrate, and a barrier material is formed on the substrate around the resistors to isolate each resistor inside a thermal ejection chamber. The barrier material is shaped both to form the thermal ejection chambers, and to provide fluid communication between the chambers and the ink supply slot. In this way, the thermal ejection chambers are filled by capillary action with ink from the ink supply slot, which itself is supplied with ink from an ink reservoir in the print cartridge of which the printhead forms part.

The composite assembly described above is typically capped by a metallic nozzle plate having an array of drilled orifices which correspond to and overlie the ejection chambers. The printhead is thus sealed by the nozzle plate, but permits ink flow from the print cartridge via the orifices in the nozzle plate.

The printhead operates under the control of printer control circuitry which is configured to energise individual resistors according to the desired pattern to be printed. When a resistor is energised it quickly heats up and superheats a small amount of the adjacent ink in the thermal ejection chamber. The superheated volume of ink expands due to explosive evaporation and this causes a droplet of ink above the expanding superheated ink to be ejected from the chamber via the associated orifice in the nozzle plate.

Many variations on this basic construction will be well known to the skilled person. For example, a number of arrays of orifices and chambers may be provided on a given printhead, each array being in communication with a different coloured ink reservoir. The configurations of the ink supply slots, printed circuitry, barrier material and nozzle plate are open to many variations, as are the materials from which they are made and the manner of their manufacture.

The typical printhead as described above is normally manufactured simultaneously with many similar such printheads on a large area silicon wafer which is only divided up into the individual printheads at a late stage in the manufacture. The silicon wafer is typically several hundred microns (μm) in depth, for example 675 μm, which is necessary to allow robust handling. This leads to the following disadvantage.

The ink supply slots are usually cut using laser milling. This is a slow process and typically removes material 50 μm wide by 50 μm deep at a rate of 1.5 mm/sec. A typical ink supply slot 675 μm deep by 100 μm wide by several millimeters long may require 28 milling passes. To cut the ink supply slots in an entire wafer using a two-head laser slotting machine takes about 6 hours.

It is an object of the invention to provide a new construction of inkjet printhead, and a method of making such a printhead, in which this disadvantage is avoided or mitigated.

DISCLOSURE OF THE INVENTION

According to one aspect of the invention there is provided a method of making an inkjet printhead comprising providing a substrate having first and second opposite surfaces, providing a support member, bonding the second surface of the substrate to the support member, and, after the substrate and support member are bonded together, forming a plurality of ink ejection elements on the first surface of the substrate, the method further including forming communicating ink supply slots passing respectively through the substrate and support member to provide fluid communication between an ink supply and the ink ejection elements.

The invention further provides a print cartridge comprising a cartridge body having an aperture for supplying ink from an ink reservoir to a printhead, and a printhead as specified above mounted on the cartridge body with said aperture in fluid communication with said ink supply slot.

The invention further provides an inkjet printer including a print cartridge according to the preceding paragraph.

A further disadvantage with the conventional construction of printhead results from the trend towards printheads with smaller geometries (i.e. higher nozzle densities) to provide higher resolution and operating frequencies. This entails, inter alia, the use of very narrow ink supply slots, for example, 30 μm wide. However, the depth of the conventional silicon wafer (675 μm) provides a significant resistance to ink flow in the case of narrow ink supply slots, placing a limit on the speed at which ink can be supplied to the thermal ejection chamber and correspondingly limiting the speed of operation of the printhead.

Accordingly, in a preferred embodiment of the invention, the ink supply slot comprises individual ink supply slots extending through the substrate and support member respectively, the ink supply slot in the support member being in register with but of greater width than the ink supply slot in the substrate.

Even if it were practical to use thin wafers, say 50 μm thick, a high operating frequency generates more heat due to the increased resistor firing. It is necessary to dissipate this heat quickly after firing the resistor, as if it does not dissipate quickly, drive bubble collapse time is long. Drive bubble collapse time is dead-time and by reducing dead-time faster operation can be provided. However, the thin silicon substrate may not in all cases constitute an efficient heat sink, and in such circumstances this again places a limit on the frequency of operation.

Accordingly, in an embodiment, the support member acts as a heat sink.

As used herein, the terms “inkjet”, “ink supply slot” and related terms are not to be construed as limiting the invention to devices in which the liquid to be ejected is an ink. The terminology is shorthand for this general technology for printing liquids on surfaces by thermal, piezo or other ejection from a printhead, and while the primary intended application is the printing of ink, the invention will also be applicable to printheads which deposit other liquids in like manner.

Furthermore, the method steps as set out herein and in the claims need not necessarily be carried out in the order stated, unless implied by necessity.

BRIEF DESCRIPTION OF THE DRAWINGS

In the drawings, which are not to scale, the same parts have been given the same reference numerals in the various figures.

DETAILED DESCRIPTION OF THE INVENTION

There will now be described, by way of example only, the best mode contemplated by the inventors for carrying out embodiments of the invention.

Figure 1:
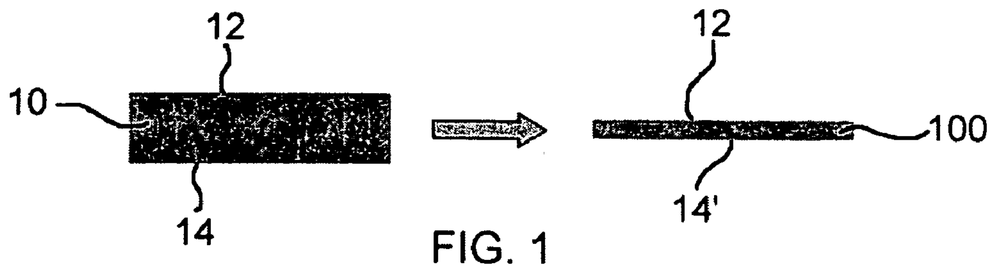
FIG. 1 is a schematic side view of a silicon wafer undergoing a reduction in thickness for use in a printhead according to an embodiment of the invention.

The left hand side of FIG. 1 shows, in side view, a substantially circular silicon wafer 10 of the kind typically used in the manufacture of conventional inkjet printheads, the wafer 10 having a thickness of 675 μm and a diameter of 150 mm (the thickness of the wafer is greatly exaggerated in FIG. 1). The wafer 10 has opposite, substantially parallel front and rear major surfaces 12 and 14 respectively, the front surface 12 being flat, highly polished and free of contaminants in order to allow ink ejection elements to be built up thereon by the selective application of various layers of materials in known manner.

The first step in the manufacture of a printhead according to the embodiment of the invention is to grind the rear surface 14 of the wafer by conventional techniques to reduce the thickness of the wafer 10 to 50 μm. This is shown on the right hand side of FIG. 1, where the front surface 12 remains undisturbed while the ground rear surface is indicated at 14'. The reduced thickness wafer is referenced 100.

The next step is to bond the rear surface 14' of the reduced thickness wafer 100 to a substantially circular support member, herein referred to as a wafer carrier 16. The wafer carrier 16 is shown in plan view in FIG. 2, and it has a diameter substantially the same as that of the wafer 100. The wafer carrier 16 is moulded using a standard injection moulding process and has a thickness of 625 μm so that the combined thickness of the carrier 16 and wafer 100 is substantially the same as the original wafer 10 so that the same wafer handling apparatus as is used for conventional wafers 10 can be used in subsequent manufacturing steps.

The carrier 16 is preferably made of aluminium nitride which has a high thermal conductivity and allows the carrier to act as a heat sink in the finished printhead. In the moulding process, aluminium nitride powder is mixed with a standard polymer carrier to allow moulding, after which the polymer is burned off at high temperature which also sinters the aluminium nitride particles together to give the final carrier 16. Silicon nitride particles may be used instead of aluminium nitride.

Figure 2:
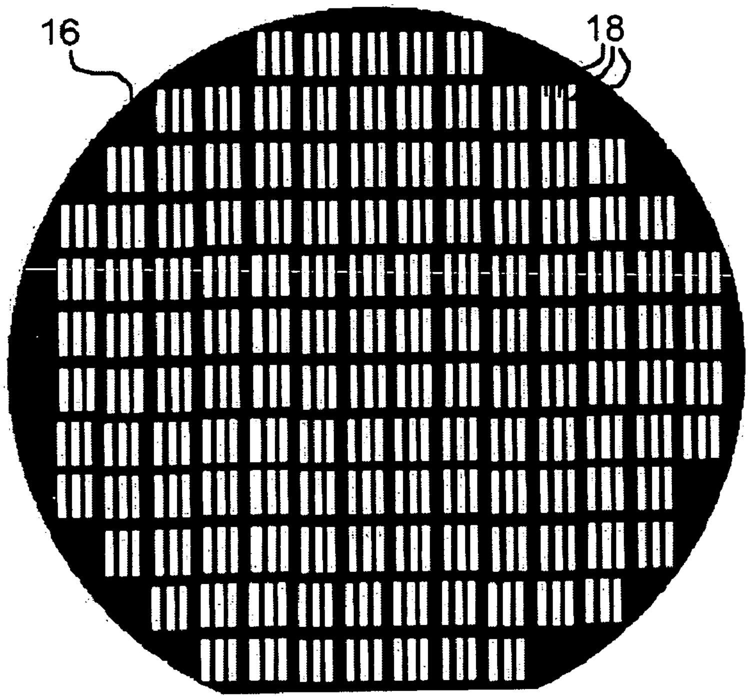
FIG. 2 is a plan view of a carrier for the thinned wafer of FIG. 1.
Figure 3:
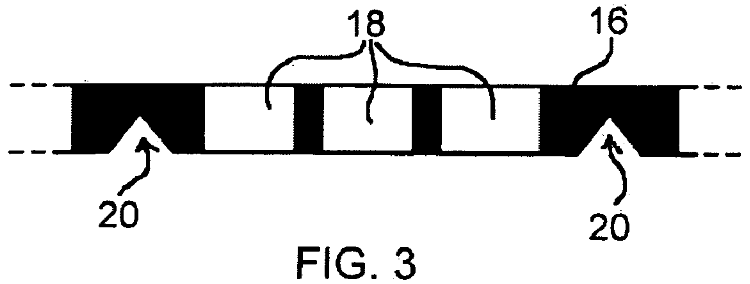
FIG. 3 is cross-section through part of the carrier of FIG. 2.

As seen in FIG. 2, the carrier 16 has a large number of slots 18 grouped in threes, each slot 18 extending fully through the thickness of the carrier. The bottom surface (not seen in FIG. 2) of the carrier 16 has grooves running vertically between each group of three slots 18 and horizontally between each row of slots 18 so that ultimately the carrier can be divided up using a conventional dicing saw into individual "dies" each containing one group of three slots 18. FIG. 3 is a cross-section through the carrier 16 showing one of the dies prior to separation from the carrier. The grooves 20 are the vertical grooves between adjacent groups of slots; the horizontal grooves are similar but run perpendicular to the grooves 20.

The wafer 100 is bonded to the top surface of the carrier 16 (i.e. the surface not containing the grooves 20), using a lead borate glass frit at 390 deg C. The result is an intimately bonded composite structure in which the upper part is a 50 μm thick layer of silicon 100 and the lower part is a 625 μm thick aluminium nitride carrier 16 containing slots 18 grouped in threes and each group of three being separated from its neighbors by horizontal and vertical grooves 20.

Figure 4:
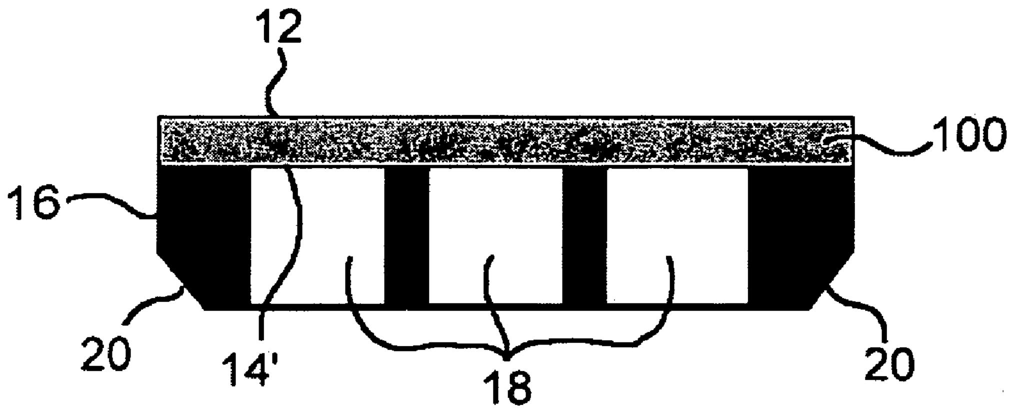
FIGS. 4 to 7 show successive steps in making a printhead according to an embodiment of the invention.

This is shown in FIG. 4 for a single die of three slots 18, such die being shown as a separate entity in FIG. 4 but actually still at this point forming an undivided part of the composite structure. However, from this point on, the method will be described for a single die for simplicity, but it will be understood that in practice the further steps required to complete the printhead, as described below, will be carried out at the wafer level simultaneously for all dies, and the individual printheads will be cut from the wafer along the grooves 20 after the printheads are substantially complete.

Next, the front surface 12 of the wafer is processed in conventional manner to lay down an array of thin film heating resistors 22 (FIG. 8) which are connected via conductive traces to a series of contacts which are used to connect the traces via flex beams with corresponding traces on a flexible printhead-carrying circuit member (not shown), which in turn is mounted on a print cartridge. The flexible printhead-carrying circuit member enables printer control circuitry located within the printer to selectively energise individual resistors under the control of software in known manner. As discussed, when a resistor 22 is energised it quickly heats up and superheats a small amount of the adjacent ink which expands due to explosive evaporation. The resistors 22, and their corresponding traces and contacts, are not shown in FIGS. 5 to 7 due to the small scale of these figures, but methods for their fabrication are well-known.

Figure 5:
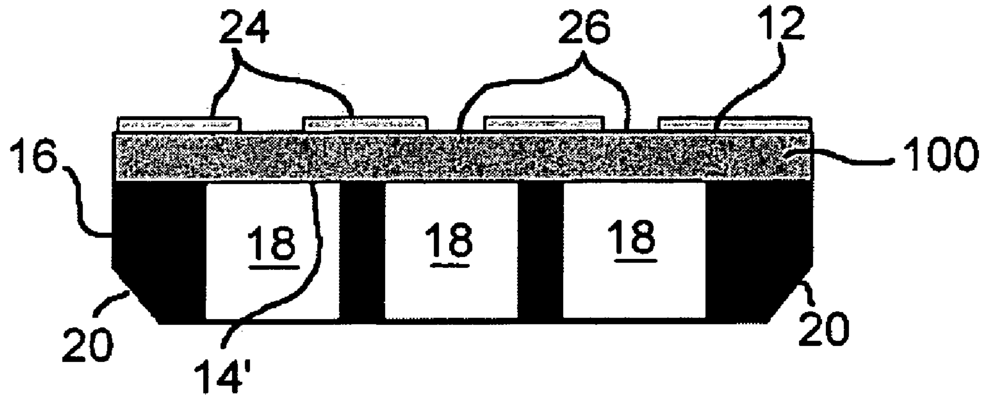

After laying down the resistors 22, a blanket barrier layer 24 of, for example, dry photoresist is applied to the entire front surface 12 of the wafer 100, FIG. 5. Then, selected regions 26 of the photoresist are removed and the remaining portions of photoresist are hard baked. Each region 26 is centered over a respective slot 18 and extends along substantially the full length thereof. In the finished printhead, the regions 26 define the lateral boundaries of a plurality of ink ejection chambers 28, FIG. 8, as will be described. Again, the formation of the barrier layer is part of the state of the art and is familiar to the skilled person.

Figure 6:
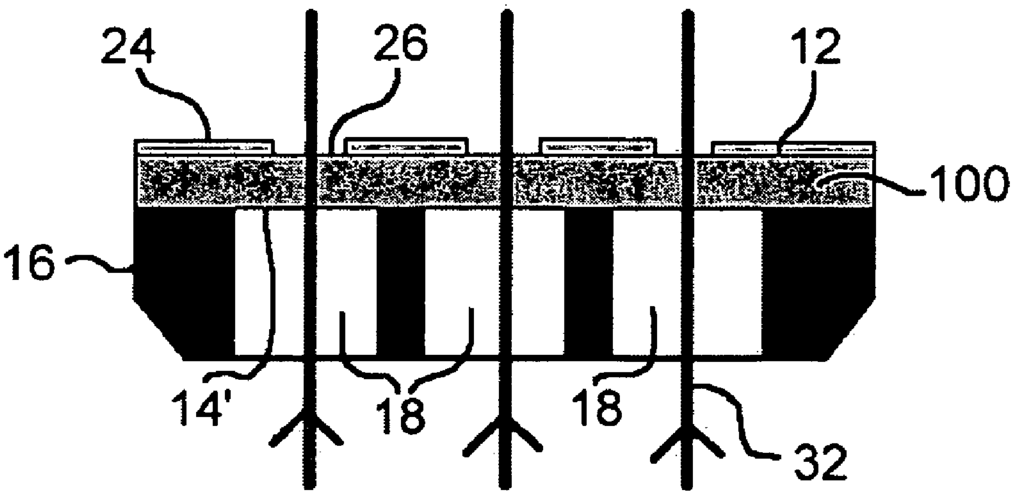

Next, FIG. 6, slots 30 (FIG. 7) are laser machined fully through the thickness of the wafer 100 using one or more narrow laser beams 32 (not all the slots 30 are necessarily machined simultaneously as suggested by the presence of beams 32 in all three slots 18 in FIG. 6). In this embodiment each slot 30 is 30 μm wide and is centered over, and extends substantially the full length of, a respective slot 18 in the carrier 16. The slots 30 could alternatively be cut by reactive ion etching. In the preferred embodiment, in either case the machining or etching is performed from below, i.e. on the rear surface 14' upwardly through the slots 18, while maintaining a greater air pressure at the front surface 12 of the wafer than at the rear surface 14' to prevent contamination reaching the front surface.

Figure 7:
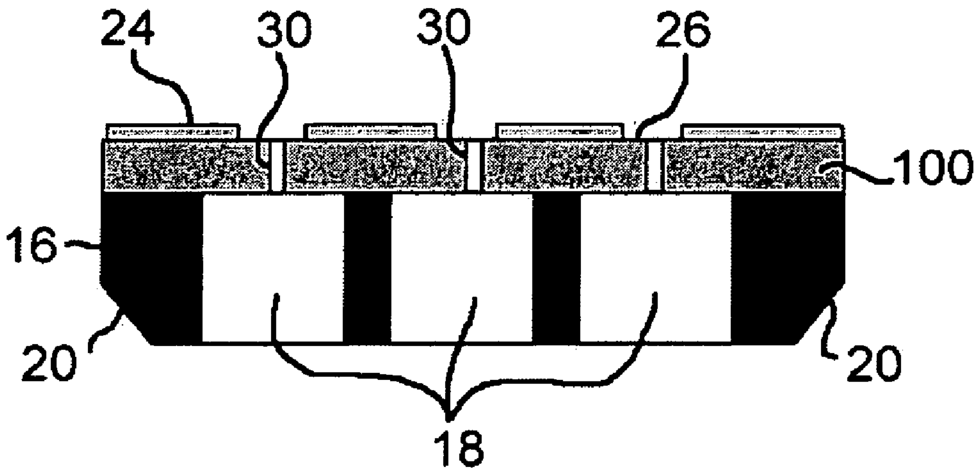

The result is shown in FIG. 7. Clearly, wafer slotting time is significantly reduced compared to the conventional 675 μm thick wafer; typically processing is twenty times faster.

Figure 8:
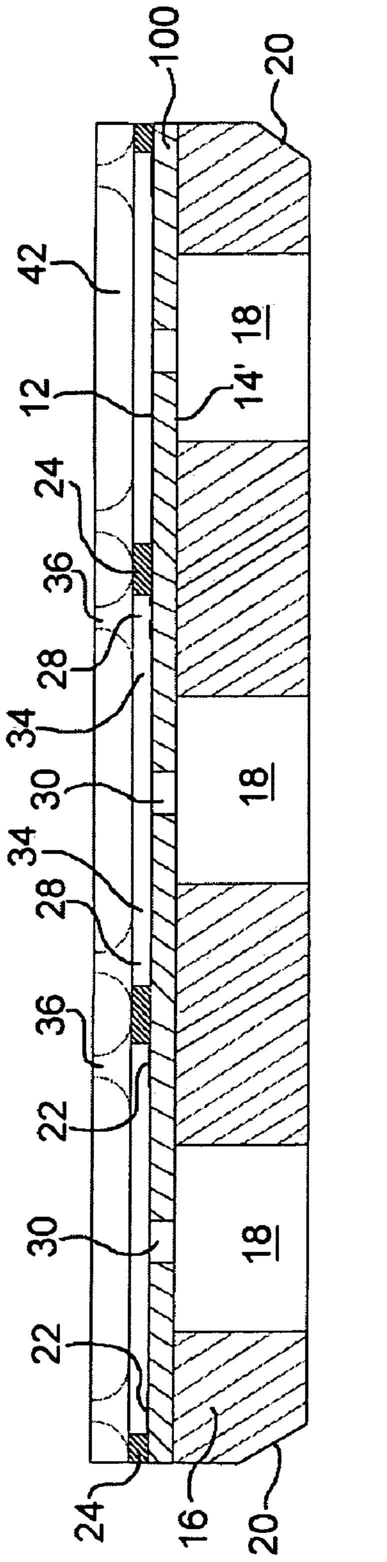
FIG. 8 is a cross-section of the final printhead made by the method of FIGS. 4 to 7.

Next, FIG. 8, a pre-formed metallic nozzle plate 42 is applied to the top surface of the barrier layer 24 in a conventional manner, for example by bonding. The final composite carrier/wafer structure, whose cross-section is seen in FIG. 8, comprises a plurality of ink ejection chambers 28 disposed along each side of each slot 30 although, since FIG. 8 is a cross-section, only one chamber 28 is seen on each side of each slot 30. Each chamber 28 contains a respective resistor 22, and an ink supply path 34 extends from the slot 30 to each resistor 22. Finally, a respective ink ejection orifice 36 leads from each ink ejection chamber 28 to the exposed outer surface of the nozzle plate 42. It will be understood that the manufacture of the structure above the wafer surface 12, i.e. the structure containing the ink ejection chambers 28, the ink supply paths 34 and the ink ejection orifices 36 as described above, can be entirely conventional and well known to those skilled in the art.

Figure 9:
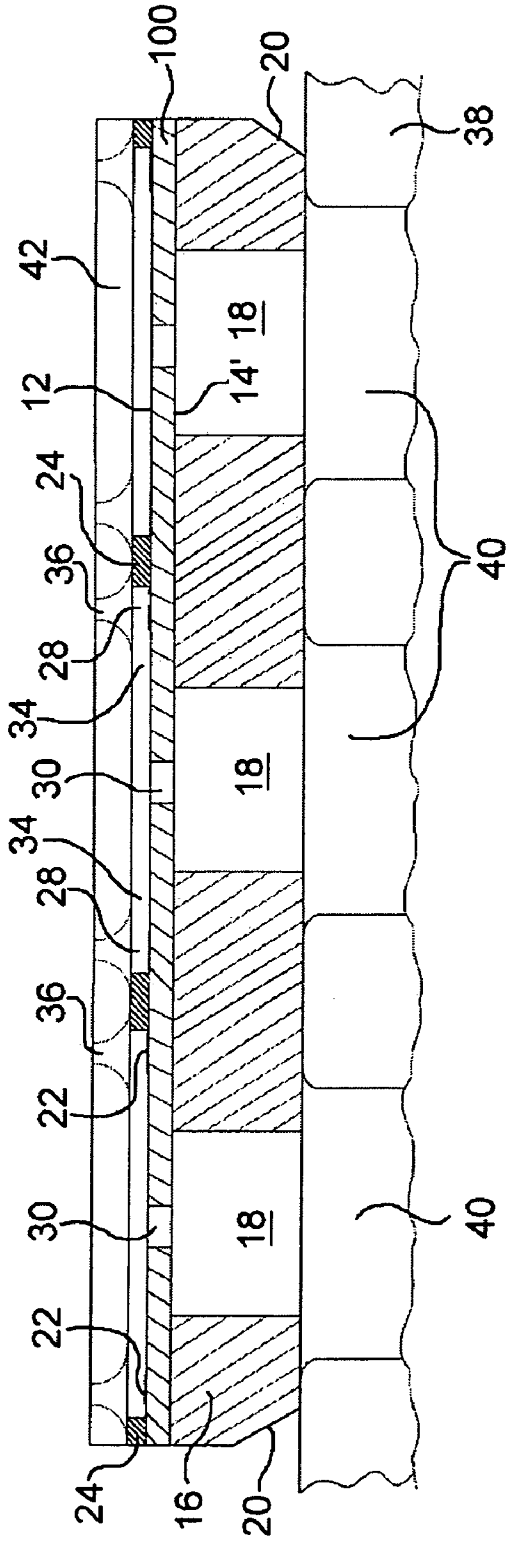
FIG. 9 is a cross-sectional view of a print cartridge incorporating the printhead of FIG. 8.

Finally, FIG. 9, the composite carrier/wafer processed as above is diced by cutting along the grooves 20 to separate the individual printheads and each printhead is mounted on a print cartridge body 38 having respective apertures 40 for supplying ink from differently coloured ink reservoirs (not shown) to the printhead. To this end the printhead is mounted on the cartridge body 38 with each aperture 40 in fluid communication with a respective slot 18 in the carrier 16.

It will be evident that each pair of registered slots 18 and 30 together supply ink of the relevant colour to the printhead, and replace the single ink supply slot in the much thicker (675 μm) substrate used in the prior art. However, due to the small depth (50 μm) of the narrow ink supply slot 30 in the substrate 100 compared to the much wider ink supply slot 18 in the carrier 16, the resistance to ink flow is much less and so faster operating frequencies can be achieved. Furthermore, the aluminium nitride carrier 16, which is directly below the resistors 22 and separated therefrom only by the thin substrate 100, has a high thermal conductivity and thus acts as a good heat sink to dissipate the heat quickly after firing the resistors 22.

Although the slots 18 in each group of three slots are shown as disposed side by side, they could alternatively be disposed end to end or staggered or otherwise offset without departing from the scope of this invention. Also, in the case of a printhead which uses a single colour ink, usually black, only one ink supply slot 18, and correspondingly only one ink supply slot 30, will be required per printhead.

The invention is not limited to the embodiment described herein and may be modified or varied without departing from the scope of the invention.

What is claimed:

1. A method of making an inkjet printhead, comprising:

providing a substrate including first and second opposite surfaces;

providing a support member;

bonding the second surface of the substrate to the support member;

after the substrate and support member are bonded together, forming a plurality of ink ejection elements on the first surface of the substrate; and forming communicating ink supply slots passing respectively through the substrate and support member to provide fluid communication between an ink supply and the ink ejection elements, wherein a slot in the support member is formed before the substrate and support member are bonded together, and a slot in the substrate is formed by material removal from the second surface of the substrate via the slot in the support member.

2. A method as claimed in claim 1, wherein the slot in the substrate is formed by laser machining the second surface of the substrate through the slot in the support member.

3. A method as claimed in claim 1, wherein the slot in the substrate is formed by reactive ion etching the second surface of the substrate through the slot in the support member.

4. A method as claimed in claim 1, wherein during the formation of the slot in the substrate the first surface of the substrate is subject to a gas pressure greater than that at the second surface of the substrate.

5. A method as claimed in claim 1, wherein providing the substrate and providing the support member includes providing the support member thicker than the substrate.

6. A method as claimed in claim 1, wherein forming the communicating ink supply slots includes forming the ink supply slot in the support member in register with but of greater width than the ink supply slot in the substrate.

7. A method as claimed in claim 1, wherein providing the substrate includes providing the substrate of silicon.

8. A method as claimed in claim 1, wherein providing the support member includes providing the support member as a heat sink.

9. A method as claimed in claim 8, wherein providing the substrate and providing the support member includes providing the support member with a higher thermal conductivity than the substrate.

10. A method as claimed in claim 8, wherein providing the support member includes providing the support member substantially of aluminum nitride or silicon nitride.

* * * * *